(12) United States Patent
Toporowski et al.

(10) Patent No.: US 7,931,078 B2
(45) Date of Patent: Apr. 26, 2011

(54) STUFFING BOX APPARATUS

(75) Inventors: Barton Toporowski, Lloydminster (CA); Dale Hockley, Lloydminster (CA); Perry Bateman, Lloydminster (CA)

(73) Assignee: Scope Production Developments Ltd., Llyodminster, AB (CA)

( * ) Notice: Subject to any disclaimer, the term of this patent is extended or adjusted under 35 U.S.C. 154(b) by 174 days.

(21) Appl. No.: 12/390,829

(22) Filed: Feb. 23, 2009

(65) Prior Publication Data

US 2009/0211750 A1 Aug. 27, 2009

Related U.S. Application Data

(60) Provisional application No. 61/030,612, filed on Feb. 22, 2008.

(51) Int. Cl.
*E21B 33/08* (2006.01)
(52) U.S. Cl. ............... 166/84.1; 166/85.3; 277/323
(58) Field of Classification Search .......... 166/85.3, 166/88.1, 84.1; 277/323, 343, 511
See application file for complete search history.

(56) References Cited

U.S. PATENT DOCUMENTS

| | | | |
|---|---|---|---|
| 3,523,691 A * | 8/1970 | Holliman | 277/329 |
| 4,345,766 A | 8/1982 | Turanyi | |
| 4,886,241 A * | 12/1989 | Davis et al. | 251/214 |
| 4,896,367 A | 1/1990 | Newton et al. | |
| 4,981,174 A * | 1/1991 | White | 277/516 |
| 5,058,668 A | 10/1991 | Newton | |
| 5,343,944 A * | 9/1994 | Bassinger | 166/84.4 |
| 5,538,080 A * | 7/1996 | Bassinger | 166/84.2 |
| 5,622,371 A * | 4/1997 | Angelo et al. | 277/329 |
| 6,412,783 B1 | 7/2002 | Finnestad | |

FOREIGN PATENT DOCUMENTS

| | | |
|---|---|---|
| CA | 2350047 | 12/2001 |
| CA | 2436924 | 2/2004 |
| CA | 2452969 | 6/2004 |
| CA | 2587761 | 11/2007 |
| CA | 2591288 | 12/2007 |

\* cited by examiner

*Primary Examiner* — Kenneth Thompson
(74) *Attorney, Agent, or Firm* — Ade & Company Inc.; Ryan W. Dupuis; Kyle R. Satterthwaite

(57) ABSTRACT

A stuffing box apparatus for sealing between a polish rod in a hydrocarbon production well comprises a tubular housing arranged for connection to the well which has a bore therethrough to receive the polish rod. Sealing members are supported in the bore of the housing in an upper stack and a lower stack of smaller outer diameter separated by an intermediate bushing. An upper bushing compresses the upper stack against the intermediate bushing. The lower bushing fixes the lower stack against the bottom of the intermediate bushing. Each of the bushings includes a counter bore formed at one end which receives a wiper member arranged for sealing engagement between the bushing and the polish rod.

20 Claims, 4 Drawing Sheets

STUFFING BOX APPARATUS

This application claims the benefit under 35 U.S.C. 119(e) of U.S. provisional application Ser. No. 61/030,612, filed Feb. 22, 2008.

FIELD OF THE INVENTION

The present invention relates to a stuffing box for sealing between a wellhead and a polish rod received therethrough.

BACKGROUND

In a well pumping apparatus, it is customary to employ a stuffing box at the wellhead to prevent oil, water and gases produced under pressure by the pumping apparatus from escaping into the atmosphere. Generally, the stuffing box is disposed in surrounding relation to the polished rod in order to guide or center the polished rod for vertical reciprocal movement or for rotation without the escape of produced liquids or gases. Typically, the stuffing box is able to prevent the loss of produced liquids and gases by utilization of a series of packing coils which are compressed within the stuffing box by bearings at opposite ends of the coils and are squeezed or otherwise forced against the coils by a threaded end member. The stuffing box is connected directly into the well production string, for example, by threading the lower end of the stuffing box into a conventional flow tee or pipe fitting.

Typical packing seals comprise split seals of woven or fibrous materials and the like which require compression for effecting a good seal around the polished rod. Typical examples of packing seals in stuffing boxes can be found in U.S. Pat. No. 5,058,668 belonging to Newton and U.S. Pat. No. 6,412,783 belonging to Finnestead and Canadian patent application 2,591,288 belonging to Smith International Inc. Due to the compression required to effect a good seal, it is common for these types of seals to wear quickly and to lose their sealing ability due to overheating from relative movement of the polished rod against the packed seals. When relying solely on such packing type seals as noted in the cited examples above, poor sealing performance is achieved and there is concern for damage to the polish rod or the housing of the stuffing box due to debris entering the stuffing box due to the movement of the polish rod.

To prevent the entry of debris, a scraper ring may be provided such as disclosed in U.S. Pat. No. 4,345,766 belonging to Turanyi. While the scrapers assist in preventing large debris from entering into the housing of the stuffing box, the configuration of the scrapers provide no assistance to sealing against the polish rod for containing the pressure in the well.

Canadian patent 2,452,696 belonging to Baycroft discloses another example of a stuffing box housing in which sealing is provided solely by packing seals under compression within the housing between bushings at opposed ends of the housing. The bushings are arranged for engaging the polish rod directly which may be of concern for wearing due to the design of the bushings. The patent to Baycroft is concerned primarily with a rubber sealing ring at the bottom of the housing which is only useful for engaging the rod coupler of the polish rod when flushing the well due to the interior of the diameter of the sealing ring being arranged to be greater than the diameter of the polish rod so that no sealing engagement is provided therebetween.

SUMMARY OF THE INVENTION

According to one aspect of the invention there is provided a stuffing box apparatus for effecting a seal with a polish rod having a substantially constant diameter extending from a hydrocarbon production well, the apparatus comprising:

a tubular housing having a bore extending in an axial direction through the housing between a top end and a bottom end of the housing so as to be arranged to receive the polish rod therethrough, the bottom end being arranged for connection to the well;

a plurality of sealing members supported in the bore of the tubular housing and arranged for sealing engagement between the tubular housing and the polish rod arranged to be received through the housing;

a lower bushing supported within the bore so as to be arranged for engagement between the tubular housing and the polish rod at a location below the plurality of sealing members;

the lower bushing comprising a body, a main bore extending through the body and having a diameter arranged to closely receive the substantially constant diameter of the polish rod therethrough and a counter bore formed at one end of the body and having a diameter which is greater than a diameter of the main bore;

a wiper member mounted in the counter bore of the lower bushing;

the wiper member being arranged for sealing engagement between the lower bushing and the polish rod.

By providing wiper members in sealing engagement with the polish rod in addition to separate sealing members, sealing is provided with improved reliability and improved wear performance as compared to the prior art. By locating the wiper member in a counter bore within the bushing at the lower end of the housing, the wiper member can be readily replaceable while being optimally located below the packing seals for extending the life of the sealing members. The counter bore in the bushing which receives the wiper member therein provides a sealing function to the bushing in addition to centering the polish rod relative to the housing of the stuffing box.

The lower bushing is preferably arranged to be threadably received within the bore in the tubular housing through the bottom end of the housing. The lower bushing may include left hand threads thereon.

The lower bushing and at least some of the sealing members are preferably removable from the bore in the tubular housing through the bottom end of the housing.

The wiper member may comprise a solid and continuous sealing member about a circumference of the polish rod.

The wiper member may further comprise an annular inner portion of sealing material and an annular outer portion formed of metal providing support to the annular inner portion.

There may be provided a plurality of bushings at axially spaced positions along the bore in which each bushing includes a counter bore formed therein within which there is mounted a wiper member in sealing engagement between the bushing and the polish rod.

There may be provided an upper bushing supported within the bore above the plurality of sealing members in which the upper bushing includes a counter bore formed therein within which there is mounted a wiper member for sealing engagement between the upper bushing and the polish rod.

Preferably there is provided an intermediate bushing having a stepped outer diameter which is arranged to be supported within the bore in which the bore has a stepped internal diameter against which the stepped outer diameter of the intermediate bushing is abutted. In this instance, there may be provided a plurality of the sealing members in a primary stack below the intermediate bushing and a plurality of the sealing members in a secondary stack above the intermediate bushing.

A retainer ring may be received within a respective annular groove formed in the bore in the housing in which the retainer ring is arranged to retain the intermediate bore engaged against a shoulder formed in the bore by the stepped internal diameter.

The plurality of sealing members preferably include a plurality of primary sealing members adjacent the bottom end of the housing and a plurality of secondary sealing members different in configuration from the primary sealing members adjacent the top end of the housing.

The primary sealing members preferably each comprise a solid sealing member of continuous material surrounding the polish rod.

The solid sealing member preferably includes an inner portion of sealing material and an outer portion of rigid metal supporting the inner portion.

The secondary sealing members preferably comprise compressible split sealing members.

The primary sealing members preferably have a smaller outer diameter than the secondary sealing members.

The primary sealing members may have a cross section in a plane lying perpendicular to the axial direction of the housing which is smaller than a cross sectional area of the secondary sealing members.

Preferably the primary sealing members span between the polish rod and an intermediate portion of the bore in the housing having an interior diameter which is smaller than an upper portion of the bore in the tubular housing receiving the secondary sealing members therein.

There may also be provided an upper bushing above the secondary sealing members in which the intermediate bushing and the upper bushing each include a main bore having a diameter closely receiving the constant diameter polish rod therethrough and a counter bore formed at one end of the main bore having a diameter which is greater than the main bore and which receives a wiper member mounted therein arranged for sealing engagement between the bushing and the polish rod.

The primary sealing members are preferably removable through the bottom end of the tubular housing and both the primary sealing members and the secondary sealing members are preferably removable through the top end of the housing.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
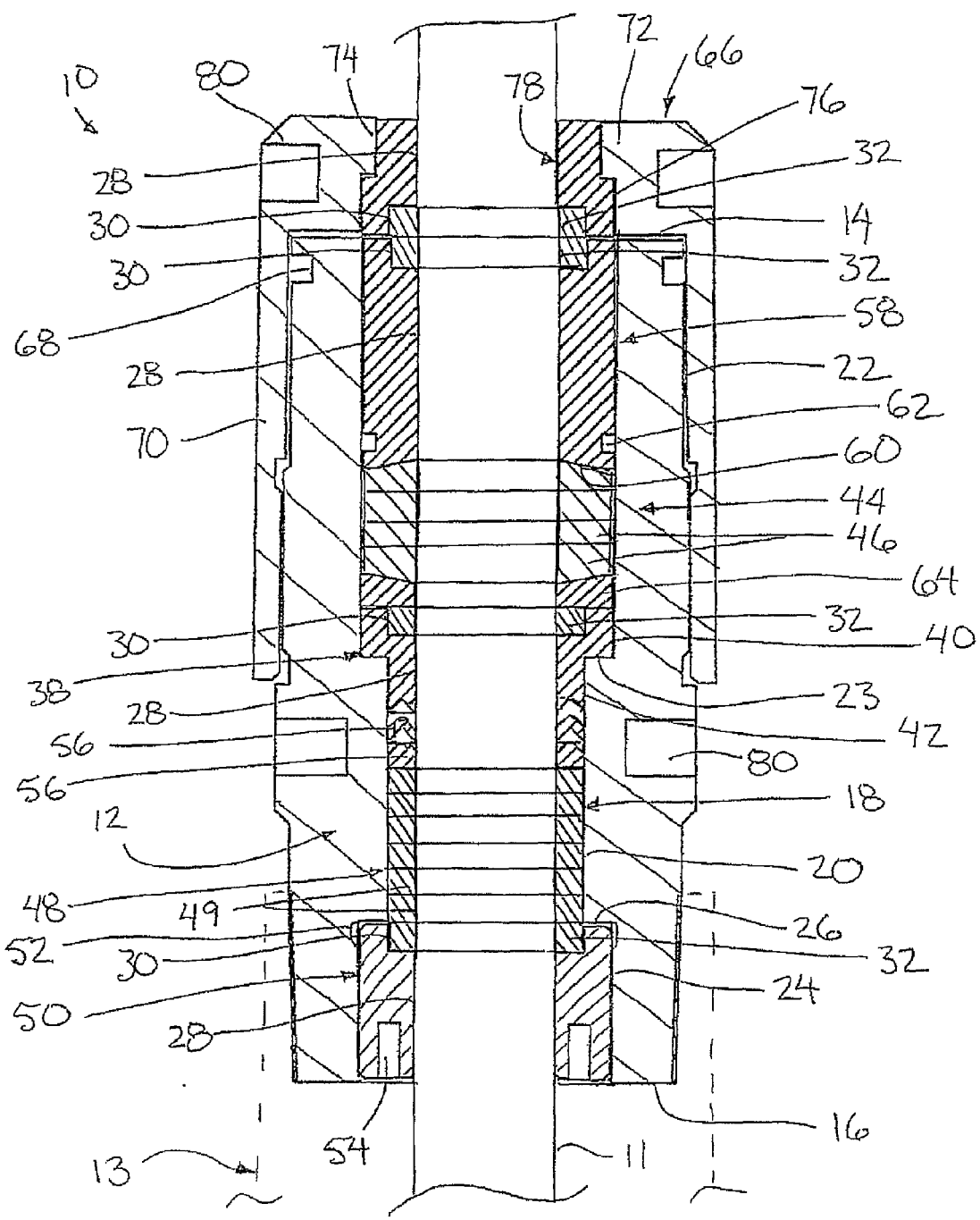
FIG. 1 is a cross sectional elevational view of the assembled stuffing box apparatus.
Figure 2:
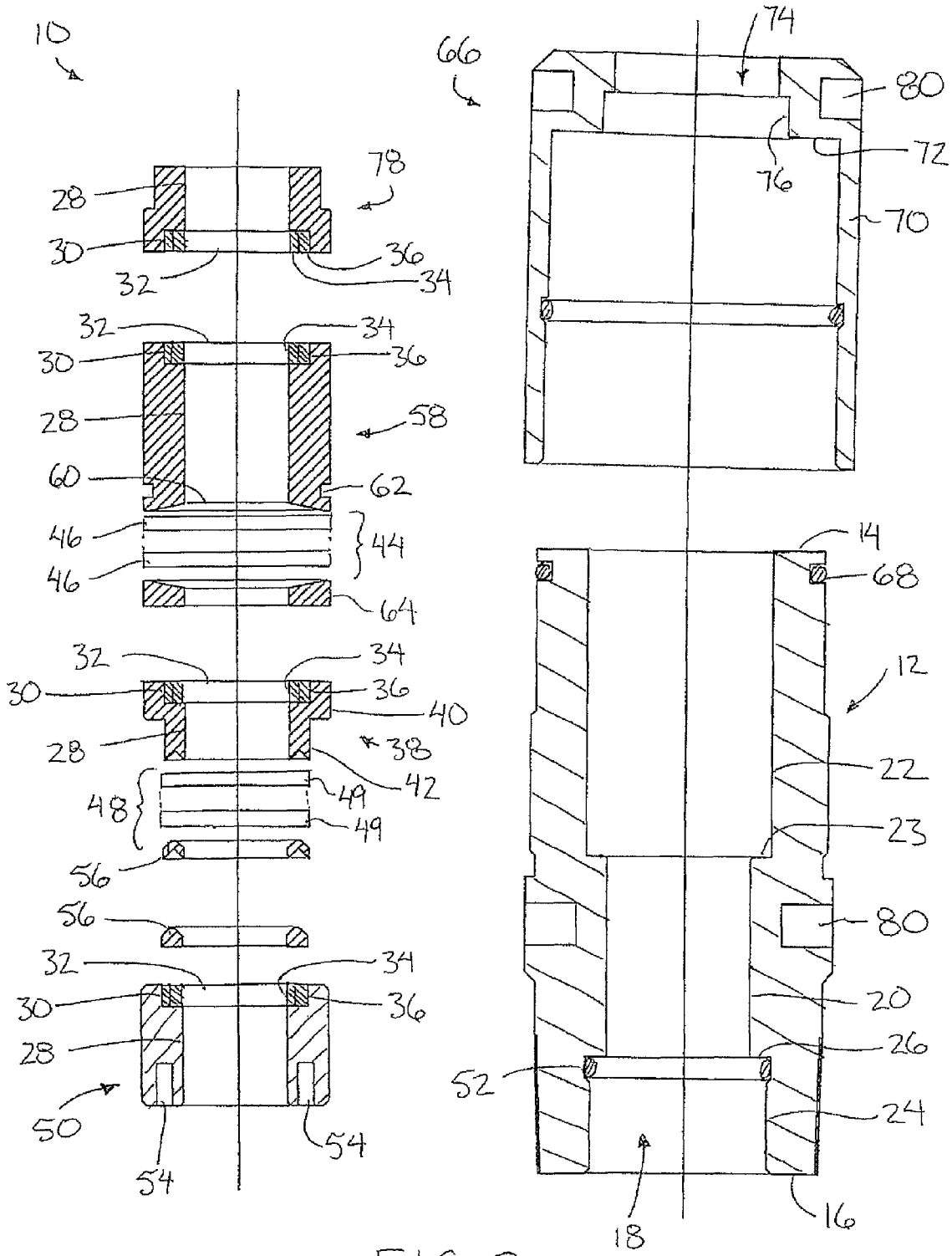
FIG. 2 is a cross sectional view of the components of the stuffing box apparatus according to FIG. 1 in an exploded configuration.
Figure 3:
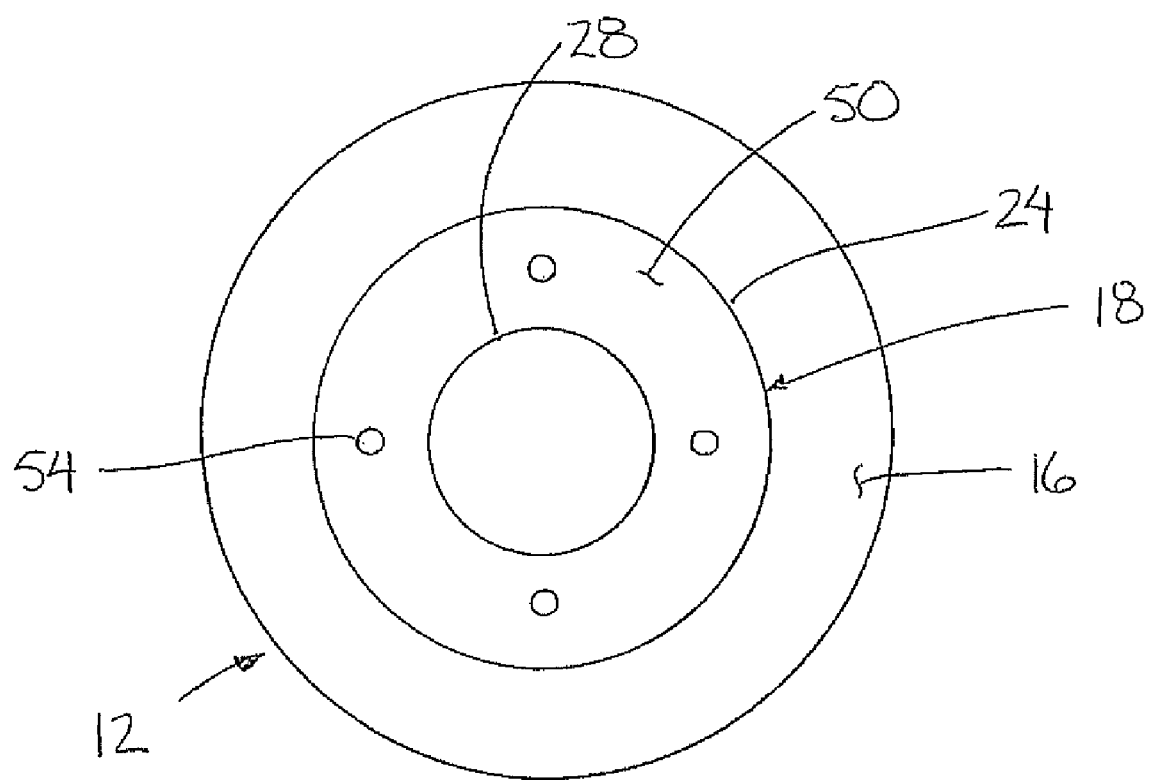
FIG. 3 is a bottom end view of the lower bushing supported in the housing of the stuffing box apparatus according to FIG. 1.

Referring to the accompanying figures there is illustrated a stuffing box apparatus generally indicated by reference 10.

The apparatus 10 is particularly suited for sealing between the polish rod 11 and the well head of a hydrocarbon production well 13. The polish rod 11 has a constant diameter and is arranged to extend from the well in a conventional manner.

The apparatus 10 comprises a tubular housing 12 which extends in an axial direction between a top end 14 and a bottom end 16 thereof. The bottom end 16 of the housing is configured for mating and sealing connection to the well 13.

A bore 18 extends axially through the housing for receiving the polish rod of the well therethrough. The bore diameter is arranged to be greater than the diameter of the rod along a full length of the tubular housing so that an annular gap is defined between the polish rod and the surrounding inner surface of the bore 18 along the full length of the housing such that sealing material can be received in the gap.

The bore 18 includes an intermediate portion 20 generally centrally located along the length of the housing to be spaced from either of the opposed top and bottom ends of the housing. The intermediate portion 20 of the gap has a first diameter which is greater than the polish rod for defining a first annular gap therebetween which receives sealing material.

An upper portion 22 of the bore 18 extends above the intermediate portion to the top end of the housing. The upper portion 22 includes a constant diameter which is greater than the diameter of the intermediate portion to define an upwardly facing annular shoulder 23 between the intermediate portion 20 and the upper portion 22.

The bore 18 also includes a lower portion 24 extending from the intermediate portion 20 to the bottom end of the housing. The lower portion 24 has a diameter which is also greater than the intermediate portion so as to be near the diameter of the upper portion 22. A downwardly facing shoulder 26 is defined at the junction of the lower portion 24 and the intermediate portion 20.

A plurality of bushings are provided at axially spaced positions along the bore 18 within the housing for centering the polish rod relative to the surrounding housing. Each bushing includes a body formed of brass material or another metal which is softer than the metal of the polish rod so that the bushings are arranged to wear before either the polish rod or the housing is subject to wear.

An outer diameter of each of the bushings is arranged to fit within the bore 18 of the housing. The interior diameter of each bushing includes a main bore 28 extending axially therethrough having an interior diameter which is approximately equal to the exterior diameter of the polish rod for closely fitting the polish rod received therethrough and for centering the polish rod relative to the surrounding housing. A counter bore 30 is provided at one end of the main bore 28 in each of the bushings having a diameter which is greater than the diameter of the main bore.

A wiper member 32 is received within each counter bore 30 so as to be snugly fit within the counter bore 30. An interior diameter of the wiper member is approximately equal to the diameter of the polish rod for engaging the polish rod received therethrough in a sealing engagement. The wiper member comprises a solid seal forming a continuous ring about the polish rod so that the seal requires mounting on the rod by sliding onto the end of the rod. The wiper member is formed of a rigid material which is softer than the material of the polish rod or the bushing upon which it is mounted. Each wiper member includes an inner portion 34 of suitable material for sealing engagement with the polish rod. Suitable materials include various forms of plastic or rubber and various low friction synthetic materials, for example Teflon and the like. Each wiper member also includes an outer portion 36 which surrounds the inner portion 34 and which is formed of a more rigid metallic material in a preferred embodiment for providing support to the inner portion 34.

Among the bushings there is provided an intermediate bushing 38 which has a stepped outer diameter for fitting within the bore 18 at the junction of the intermediate portion and the upper portion. Accordingly the intermediate bushing 38 includes an upper portion 40 having an outer diameter which fits within the upper portion of the bore 18 and a lower portion 42 having an outer diameter which fits within the intermediate portion of the bore 18 so as to be smaller in diameter than the upper portion. A downwardly facing shoulder is defined at the junction of the upper and lower portions of the intermediate bushing for abutting engagement with the upwardly facing shoulder 23 on the housing. The main bore 28 of the bushing extends fully through the bushing at the lower portion 42 while the counter bore 30 is located at the top end of the intermediate bushing within the upper portion of the bushing.

The intermediate bushing 38 serves to separate an upper stack 44 of sealing members 46 and a lower stack 48 of sealing members 49. The upper stack 44 of sealing members is located within the upper portion of the bore 18 housing above the intermediate bushing 38. The lower stack 48 of sealing members 49 are located in the intermediate portion of the bore below the intermediate bushing so that the sealing members 49 have a smaller outer diameter than the sealing members 46 to fit within the intermediate portion of the bore in the housing. The sealing members of both stacks have the same interior diameter for sealing engagement against the constant diameter polish rod received therethrough. Due to the smaller outer diameter of the sealing members of the lower stack, the sealing members 49 have a smaller cross sectional area along a plane perpendicular to the axial direction of the housing than the sealing members of the upper stack so as to be better suited to sealing engagement with the polish rod to contain higher pressures within the well than the sealing members in the upper stack. The sealing members in the lower stack within the intermediate portion of the bore in the housing thus form a primary sealing with the polish rod whereas the sealing members in the upper stack are relied upon only for secondary sealing with the polish rod.

The sealing members 46 in the upper stack 44 comprise compression type packing sealing members which are split for ease of insertion onto the polish rod. The sealing members 46 are typically formed of a fibre or woven material, typically including a coating thereon for example combinations of kevlar, wax, graphite, etc.

Alternatively the sealing members 49 of the lower stack 48 are different in configuration than the sealing members of the upper stack. The sealing members 49 comprise solid sealing members having no split so as to be continuous in an annular shape about the polish rod. The sealing members 49 include an inner portion of softer material for example plastic, rubber or various forms of synthetic materials suitable for sealing engagement with the polish rod under high pressure, while an outer portion of the sealing member comprises a more rigid, typically metallic material to provide support surrounding the softer inner portion of the sealing member. Accordingly the sealing members 49 are configured similarly to the wiper members 32 received within the counter bores in the bushings respectively.

Among the bushings there is also provided a lower bushing 50 which is arranged to be threadably received within the lower portion of the bore 18 in the housing. Accordingly an outer diameter of the lower bushing 50 is substantially constant and equal to the constant diameter of the lower portion 24 of the bore in the housing. The lower bushing 50 includes external threads thereon while the lower portion of the bore in the housing includes internal threads thereon with the threads being configured for left hand threading engagement therebetween.

An annular grove 52 extends circumferentially about the lower portion of the bore in the housing adjacent the top end thereof near the downwardly facing shoulder of the housing so as to be arranged to receive a resilient O-ring therein which provides sealing between the lower bushing 50 and the surround bore of the housing when the lower bushing is threaded into the lower portion of the bore in the housing. The lower bushing 50 includes the main bore 28 thereof extending fully through the bushing from the bottom end to the top end locating the counter bore 30 therein. Accordingly the wiper member 32 is received in the top end of the lower bushing 50.

A plurality of sockets 54 are formed in the annular end face at the bottom end of the lower bushing 50 so that the sockets project axially inward in the axial direction of the housing at a plurality of circumferentially spaced positions about the main bore. The sockets serve for mating engagement with a suitable tool for effecting the rotation of the lower bushing relative to the housing during assembly of the stuffing box apparatus.

The sealing members 49 in the lower stack are arranged to be engaged within the intermediate portion of the bore in the housing between the lower bushing threaded into the lower portion of the bore in the housing and the intermediate bushing engaged upon the shoulder 23 of the housing.

A pair of annular rings 56 are provided having inner and outer diameters similar to the sealing members 49 in the lower stack for being supported axially in series with the sealing members 49 between the lower bushing and the intermediate bushing of the stuffing box apparatus. The brass rings 56 serve as the packing back up and the packing starter.

Among the bushings there is also provided an upper bushing 58 arranged to be slidably received within the upper portion of the bore of the housing. The upper bushing 58 is supported above the upper stack 44 of the sealing members 46 so that the sealing members 46 are arranged to be compressed between the upper bushing 58 thereabove and the intermediate bushing therebelow. A bottom face 60 of the upper bushing 58 is arranged to be sloped to extend upwardly and radially inwardly from the outer diameter to the main bore 28 extending through the bushing so that the slope of the bottom face urges the sealing material of the sealing members 46 inwardly against the rod as the upper bushing is pressed downwardly into the sealing members of the upper stack. An annular grove 62 is provided about the outer circumference of the upper bushing 50 adjacent the bottom end thereof for receiving a resilient O-ring therein which is arranged for engagement with the surrounding upper portion of the bore in the housing for sealing between the upper bushing and the surrounding housing. The counter bore 30 of the upper bushing is provided at the top end thereof so that the wiper member 32 received therein is similarly located at the top end of the upper bushing 58.

A backing member 64 also having a brass body similarly to the bushings is arranged to be received within the upper portion of the bore in the housing axially in series with the sealing members 46 of the upper stack 44. The backing member 64 has inner and outer diameters similarly to the sealing members 46. A bottom end face of the backing member is flat for abutment against the wiper member in the counter bore at the top end of the intermediate bushing. The opposing top end face of the backing member is sloped for engagement against the sealing members 46 there above. The top end face is sloped downwardly and radially inward for urging the sealing members 46 inwardly into sealing engagement with the polish rod when the sealing members 46 are compressed between the backing members 64 and the bottom of the upper bushing 58 as the upper bushing is pressed downwardly into the housing towards the upwardly facing shoulder 23 of the housing providing backing for the intermediate bushing and backing members 64 supported thereon.

The upper bushing 58 is pressed downwardly into the housing and against the shoulder of the housing by a cap member 66 which is threadably engaged onto the top end of the housings. The housing is externally threaded at an intermediate location between the top and bottom ends thereof above the intermediate portion of the bore for threaded engagement with internal threads on the cap member 66. The housing also includes an annular grove 68 receiving a resilient O-ring therein adjacent the top end of the housing.

The cap member 66 includes a generally tubular cylindrical wall 70 arranged to be slidably received overtop of the outer diameter of the housing. A lower portion of the cylindrical wall 70 is internally threaded for threading engagement with the external threads on the housing when the wall 70 surrounds the housing by overlapping the housing in the axial direction along the length of the upper portion of the bore 18 therein. The cap member also includes an end wall 72 at a top end thereof which spans across the top end of the housing when threaded onto the housing.

A through bore 74 is provided through the end wall 72 in alignment with the bore of the housing and having a diameter which is near the diameter of the intermediate portion of the bore. A counter bore 76 is also provided at the bottom end of the through bore 74 which has a diameter which is near the diameter of the upper portion of the bore in the housing. A cap bushing 78 is arranged to be received in the bore 74 and counter bore in the end wall of the cap member having a brass body similarly to the bushings noted above. The cap bushing 78 similarly includes a main bore 28 extending therethrough having dimensions which closely receive the polish rod therethrough and a counter bore 30 at the bottom side of the bushing 78 which receives a wiper member 32 therein which again has an interior diameter for closely and sealably engaging the polish rod therethrough.

A plurality of radially extending sockets are provided at circumferentially spaced locations about a top end of the cap member and about the housing in alignment with the intermediate portion of the bore for engagement of suitable tools into the sockets to effect relative rotation between the cap member and the housing as the cap member is threaded onto the housing. The counter bore 76 in the cap member defines a downwardly facing shoulder engaging a stepped outer diameter of the cap bushing 78 received therein for compressing downwardly onto the upper bushing in the housing as the cap member is threaded downwardly onto the housing.

In order to assemble the stuffing box apparatus of the present invention, the sealing members of both the upper and lower stacks may be slidably inserted through the top end of the bore in the housing by insertion in sequence with the intermediate bushing therebetween. Alternatively, with the intermediated bushing in place, the sealing members of the lower stack may be slidably receiving through the open bottom of the housing while the sealing members of the upper stack are slidably received through the open top of the housing prior to insertion of the lower bushing and upper bushing respectively. Once the upper and lower bushings are in place, the cap member can be positioned overtop of the top end of the housing and the lower bushing can be threaded into the bottom end of the housing. Threadably engaging the lower bushing within the bottom end of the housing provides compressive force against the sealing members in the lower stack while threadably tightening the cap member relative to the housing serves to compress the sealing members of the upper stack between the intermediate bushing and the upper bushing.

In use the sealing members in the upper stack function as secondary sealing between the housing and the polish rod received therethrough so that the sealing members can be supported under minimal axial compression as compared to typical packing or compression type split seals found in typical stuffing box apparatuses. The smaller cross sectional area as measured in a plane perpendicular to the axial direction of the housing of the primary sealing members in the lower stack serve to contain the high pressures of the well and the substantially isolate the upper portions of the stuffing box from the high pressure, to allow minimal compression on the secondary sealing members in the upper stack, thereby preventing premature wear on the secondary sealing members.

The configuration of the bushings having a body of softer material than the polish rod or the housing serve to centralize the rod within the housing while ensuring that the bushings are the first components to wear thus removing potential damage from the polish rod or the housing. The solid seals received within counter bores in each of the bushings provide an additional sealing function to the bushings in addition to centralizing the rod while also performing a wiping function at opposing ends of the stuffing box to prevent debris from entering the stuffing box along the polish rod. The two different configurations of sealing members in the primary and secondary stacks according to the present invention are well suited for functioning as a primary high pressure seal and a secondary back up seal which is protected from wear and high pressure.

As described herein, the apparatus according to the present invention consists of a complete left hand threaded bottom brass unit that is mounted inside of the main stuffing box body. By having this assembly mounted as mentioned it is easier to change out the entire seal assembly by pushing all primary seals out through the bottom of the main stuffing box body. The bushings have a metal clad seal that is mounted inside of it. This seal is used for the purpose of directing bottom hole pressure away from the primary seal stack of the stuffing box. All the brass that is used in this design is there to absorb the metal wear away from the polish rod and main stuffing box body. Each seal that is used in all the brass and the primary configuration is a complete solid seal with no splits and is disposable.

The following features of the present invention are of note:

The initial seal in the bottom brass bushing has a small cross sectional area to help reduce bottom hole pressure away from the primary and secondary seal stacks.

The primary seal stack seals all have a small cross sectional area seals to prevent high pressure force from contacting the secondary seal stack. The secondary seal stack is used for containment purpose only and can be changed on the well if needed.

The design of the stuffing box is suitable for both reciprocating and rotary action of the polish rod.

The bottom brass guide complete with metal clad wiper seal is threaded into the bottom side of the main stuffing box body. By having this there it is intended to take the main brunt of debris and liquids away from the primary and secondary seals thus allowing more hours of service before having to replace the entire primary and secondary seals.

A top brass pusher complete with O-ring design and metal clad wiper seal compresses both primary and secondary seals to complete the seal around the main rod shaft and to help with the centralization of the main rod shaft.

A center brass spacer complete with metal clad wiper seal completes the space between both primary and secondary seal stacks as well as adds in centralization of the main rod shaft.

A top cap brass guide complete with metal clad wiper seal is compressed into the top cap of the main stuffing box assembly. This piece is used to apply direct pressure onto the top brass pusher and also helps with main rod centralization.

The intent of the brass is to address any wear that may happen with rotary or reciprocating actions and thus can be replaced if need be rather than causing any damage to the main stuffing box assembly. A main box body or housing is used to encompass all of the above. A top cap assembly is threaded onto the main box body.

Figure 4:
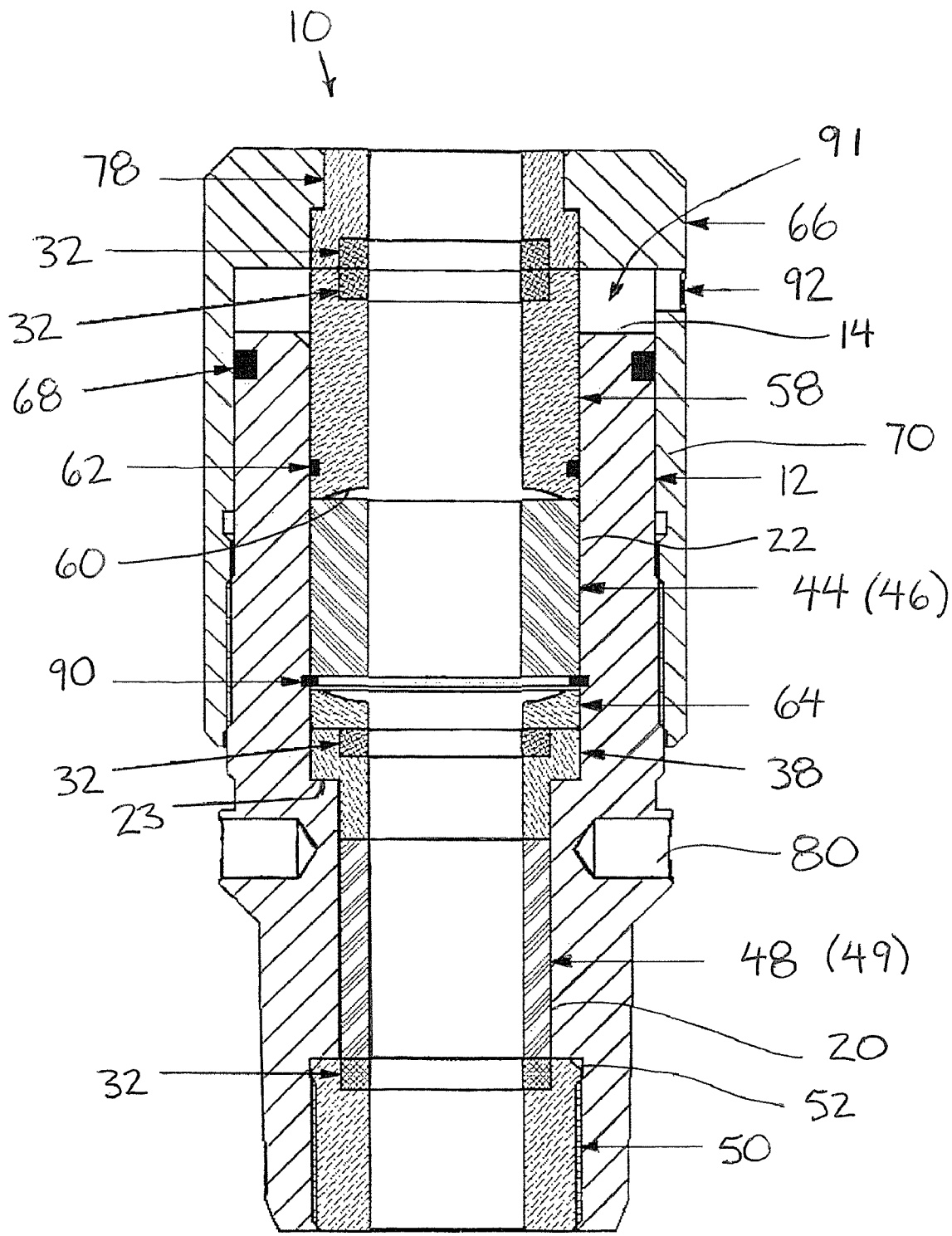
FIG. 4 is a cross sectional view of the assembled stuffing box apparatus according to a second embodiment.

Turning now to FIG. 4, a further embodiment of the stuffing box apparatus 10 is shown which is substantially identical to the previous embodiment with regard to the configuration of the metal clad wiper members 32 received in the respective counter bores in the intermediate bushing 38, the lower bushing 50, the upper bushing 58 and the cap bushing 78. The second embodiment of the apparatus 10 is also similar to the previous embodiment with respect to the rope packing forming the sealing members 46 of the upper stack 44 and the metal clad seals forming the sealing members 49 in the lower stack 48.

The second embodiment differs from the previous embodiment in that the backing member 64 is engaged directly against the upper end face of the intermediate bushing 58 to retain the wiper member 32 in the respective counter bore in the upper end face of the intermediate bushing. Furthermore, a retainer ring 90 is providing within a respective annular groove in the upper portion 22 of the bore 18. The retainer ring retains the backing member 64 and the upper portion of the intermediate bushing engaged between the retaining ring and the upward facing shoulder 23 formed in the bore 18 through the housing 12. Using the retainer ring 90 to fix the intermediate bushing 38 relative to the housing to be prevented from movement induced by the reciprocating polish rod, the sealing members 49 in the lower stack 48 are also fixed in placed between the intermediate bushing 38 and the lower bushing 50 threaded into the bottom end of the housing. The metal clad seals forming the sealing members 49 and the wiper members 32 thus will not move or slide within the surrounding body of the housing 12 to prevent premature wear.

Furthermore, according to the second embodiment, the upper stack 44 of sealing members and the upper bushing 58 have a sufficient combined length in the longitudinal axial direction to be longer than the bore 18 in the housing between the retainer ring 90 and the top end face 14 of the housing. In this manner, when the cap member 66 is mounted over the top end of the housing such that the wall 70 of the cap member is threaded onto the external threads of the housing 12, the bottom end face of the cap bushing 78 engages the top end face of the upper bushing 58 before the end wall of the cap member engages the top end face 14 of the housing. Accordingly, an annular gap 91 is provided about the top end of the upper bushing 58 between the end face 14 of the housing and the end wall of the cap member. A grease port 92 is provided in communication through the peripheral wall 70 of the cap member in alignment with the annular gap 91 to provide grease or other suitable lubricant into the gap for sealing and for lubricating between the polish rod 11 and the surrounding bushings of the apparatus 10.

The annular gap 91 also ensures that tightening the threaded connection of the cap member onto the housing applies a compressive force in the axial direction to the sealing members 46 of the upper stack 44. The sloped end faces of the upper bushing 58 above and backing member 64 below act as in the previous embodiment to urge the sealing members 46 radially inwardly into sealing engagement about the circumference of the polish rod received therethrough.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A stuffing box apparatus for effecting a seal with a polish rod having a substantially constant diameter extending from a hydrocarbon production well, the apparatus comprising:

a tubular housing having a bore extending in an axial direction through the housing between a top end and a bottom end of the housing so as to be arranged to receive the polish rod therethrough, the bottom end being arranged for connection to the well;

a plurality of sealing members supported in the bore of the tubular housing and arranged for sealing engagement between the tubular housing and the polish rod arranged to be received through the housing;

a lower bushing supported within the bore so as to be arranged for engagement between the tubular housing and the polish rod at a location below the plurality of sealing members;

the lower bushing comprising a body, a main bore extending through the body and having a diameter arranged to closely receive the substantially constant diameter of the polish rod therethrough and a counter bore formed at one end of the body and having a diameter which is greater than a diameter of the main bore;

a wiper member mounted in the counter bore of the lower bushing;

the wiper member being arranged for sealing engagement between the lower bushing and the polish rod; and the wiper member comprising a solid and continuous sealing member about a circumference of the polish rod.

2. The apparatus according to claim 1 wherein the lower bushing is arranged to be threadably received within the bore in the tubular housing through the bottom end of the housing.

3. The apparatus according to claim 2 wherein the lower bushing includes left hand threads thereon.

4. The apparatus according to claim 1 wherein the lower bushing and at least some of the sealing members are removable from the bore in the tubular housing through the bottom end of the housing.

5. The apparatus according to claim 1 wherein the wiper member comprises an annular inner portion of sealing material and an annular outer portion formed of metal providing support to the annular inner portion.

6. A stuffing box apparatus for effecting a seal with a polish rod having a substantially constant diameter extending from a hydrocarbon production well, the apparatus comprising:

a tubular housing having a bore extending in an axial direction through the housing between a top end and a bottom end of the housing so as to be arranged to receive the polish rod therethrough, the bottom end being arranged for connection to the well;

a plurality of sealing members supported in the bore of the tubular housing and arranged for sealing engagement between the tubular housing and the polish rod arranged to be received through the housing; and a plurality of bushings at axially spaced positions along the bore so as to be arranged for engagement between the tubular housing and the polish rod, each bushing including a counter bore formed therein within which there is mounted a wiper member in sealing engagement between the bushing and the polish rod;

one of the plurality of bushings comprising a lower bushing supported within the bore at a location below the plurality of sealing members;

the lower bushing comprising a body and a main bore extending through the body and having a diameter arranged to closely receive the substantially constant diameter of the polish rod therethrough, the counter bore of the lower bushing being formed at one end of the body and having a diameter which is greater than a diameter of the main bore; and the wiper member mounted in the counter bore of the lower bushing being arranged for sealing engagement between the lower bushing and the polish rod.

7. The apparatus according to claim 6 wherein the each wiper member comprises a solid and continuous sealing member about a circumference of the polish rod.

8. The apparatus according to claim 7 wherein the plurality of bushings includes an upper bushing supported within the bore above the plurality of sealing members.

9. The apparatus according to claim 7 wherein the plurality of bushings includes an intermediate bushing having a stepped outer diameter which is arranged to be supported within the bore, the bore having a stepped internal diameter against which the stepped outer diameter of the intermediate bushing is abutted, and wherein there is provided a plurality of the sealing members in a primary stack below the intermediate bushing and a plurality of the sealing members in a secondary stack above the intermediate bushing.

10. The apparatus according to claim 9 wherein there is provided a retainer ring received within a respective annular groove formed in the bore in the housing, the retainer ring being arranged to retain the intermediate bushing engaged against a shoulder formed in the bore by the stepped internal diameter.

11. A stuffing box apparatus for effecting a seal with a polish rod having a substantially constant diameter extending from a hydrocarbon production well, the apparatus comprising:

a tubular housing having a bore extending in an axial direction through the housing between a top end and a bottom end of the housing so as to be arranged to receive the polish rod therethrough, the bottom end being arranged for connection to the well;

a plurality of sealing members supported in the bore of the tubular housing and arranged for sealing engagement between the tubular housing and the polish rod arranged to be received through the housing;

a lower bushing supported within the bore so as to be arranged for engagement between the tubular housing and the polish rod at a location below the plurality of sealing members;

the lower bushing comprising a body, a main bore extending through the body and having a diameter arranged to closely receive the substantially constant diameter of the polish rod therethrough and a counter bore formed at one end of the body and having a diameter which is greater than a diameter of the main bore;

a wiper member mounted in the counter bore of the lower bushing;

the wiper member being arranged for sealing engagement between the lower bushing and the polish rod;

the plurality of sealing members include including a plurality of primary sealing members adjacent the bottom end of the housing and a plurality of secondary sealing members different in configuration from the primary sealing members adjacent the top end of the housing.

12. The apparatus according to claim 11 wherein the primary sealing members each comprise a solid sealing member of continuous material surrounding the polish rod.

13. The apparatus according to claim 12 wherein the solid sealing member includes an inner portion of sealing material and an outer portion of rigid metal supporting the inner portion.

14. The apparatus according to claim 11 wherein the secondary sealing members comprise compressible split sealing members.

15. The apparatus according to claim 11 wherein the primary sealing members have a smaller outer diameter than the secondary sealing members.

16. The apparatus according to claim 11 wherein the primary sealing members have a cross section in a plane lying perpendicular to the axial direction of the housing which is smaller than a cross sectional area of the secondary sealing members.

17. The apparatus according to claim 11 wherein the primary sealing members span between the polish rod and an intermediate portion of the bore in the housing having an interior diameter which is smaller than an upper portion of the bore in the tubular housing receiving the secondary sealing members therein.

18. The apparatus according to claim 11 wherein there is provided an upper bushing above the secondary sealing members, the intermediate bushing and the upper bushing each including a main bore having a diameter closely receiving the constant diameter polish rod therethrough and a counter bore formed at one end of the main bore having a diameter which is greater than the main bore and which receives a wiper member mounted therein arranged for sealing engagement between the bushing and the polish rod.

19. The apparatus according to claim 11 wherein the primary sealing members are removable through the bottom end of the tubular housing.

20. The apparatus according to claim 11 wherein both the primary sealing members and the secondary sealing members are removable through the top end of the housing.

* * * * *